United States Patent
Paulsen et al.

(10) Patent No.: US 6,338,114 B1
(45) Date of Patent: Jan. 8, 2002

(54) METHOD, SYSTEM, AND PROGRAM FOR USING A TABLE TO DETERMINE AN ERASE OPERATION TO PERFORM

(75) Inventors: Michael Aloysius Paulsen, deceased, late of Morgan Hill, CA (US), by Lorrilyn R. Paulsen, legal representative; David Michael Shackelford; John Glenn Thompson, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,023

(22) Filed: Aug. 18, 1999

(51) Int. Cl.[7] .......................... G06F 12/00; G11B 5/024
(52) U.S. Cl. ...................................... 711/112; 711/154
(58) Field of Search .................................. 711/112, 154

(56) References Cited

U.S. PATENT DOCUMENTS

| | | | |
|---|---|---|---|
| 4,580,211 A | 4/1986 | Doki et al. .................. | 711/171 |
| 4,855,907 A | 8/1989 | Ferro, Jr. et al. ........... | 707/204 |
| 4,933,848 A | 6/1990 | Haderle et al. .............. | 707/201 |
| 5,193,184 A | 3/1993 | Belsan et al. ................. | 711/4 |
| 5,247,647 A | 9/1993 | Brown et al. ................. | 714/1 |
| 5,249,300 A | 9/1993 | Bachman et al. ........ | 707/104.1 |
| 5,317,730 A | 5/1994 | Moore et al. ................ | 707/100 |
| 5,546,576 A | 8/1996 | Cochrane et al. .............. | 707/2 |

FOREIGN PATENT DOCUMENTS

| | | |
|---|---|---|
| EP | 0116366 | 2/1984 |
| WO | WO9801809 | 1/1998 |

OTHER PUBLICATIONS

IBM Technical Disclosure Bulletin, "Started Task for Tracing Dynamically Allocated Non–VSAM Data Sets", 12/97, vol. 40, No. 12, pp. 175–177.
Abstract of JP59146355 from esp@cenet.
Abstract of JP9179842 from esp@cenet.

*Primary Examiner*—David L. Robertson
(74) *Attorney, Agent, or Firm*—David W. Victor; Konrad Raynes Victor & Mann LLP

(57) ABSTRACT

Disclosed is a method, system, program, and memory for erasing data. A table is provided indicating different groupings of system functions. Each grouping indicates at least one system function. For each grouping there is code to perform erase operations. An erase command to erase data in at least one storage location is received. A determination is then made of the grouping having system functions supported by the system and the table is processed to determine the code for the determined grouping. The code for the determined grouping is executed to perform erase operations with respect to each storage location.

30 Claims, 7 Drawing Sheets

| Space Release | Logical Erase | Logical Point-in-Time Copy | Code |
|---|---|---|---|
| Yes | No | No | Space release or physical erase. |
| Yes | No | Yes | Space release or physical erase; FIGs. 6a, b. |
| Yes | Yes | No | Space release or logical erase (FIG. 5) or physical erase. |
| Yes | Yes | Yes | Space release or logical erase (FIG. 5) or physical erase; FIGs. 6a, b. |
| No | Yes | No | Logical erase (FIG. 5) or physical erase |
| No | Yes | Yes | Logical erase (FIG. 5) or physical erase; FIGs. 6a, b. |

| Field Name | Description of Field |
|---|---|
| Number of Extent Pairs | Indicates the number of extent pairs in the table. |
| Target/Source Device Address | Identifies the logical address of the corresponding target or source device. |
| Source Start | Contains the CCHH for the first source track in the extent. |
| Source End | Contains CCHH of last track in extent. |
| Number of tracks | Binary count of tracks from source start location. |
| Target Start | Contains the CCHH for the first target track in the extent. |
| Target End | Contains CCHH of last target track in extent. |
| Tracks to Copy | Contains the number of tracks for each extent that have not been copied to the target, i.e., still shared |
| Sequence Number | A sequence number or time value. |

| Space Release | Logical Erase | Logical Point-in-Time Copy | Code |
|---|---|---|---|
| Yes | No | No | Space release or physical erase. |
| Yes | No | Yes | Space release or physical erase; FIGs. 6a, b. |
| Yes | Yes | No | Space release or logical erase (FIG. 5) or physical erase. |
| Yes | Yes | Yes | Space release or logical erase (FIG. 5) or physical erase; FIGs. 6a, b. |
| No | Yes | No | Logical erase (FIG. 5) or physical erase |
| No | Yes | Yes | Logical erase (FIG. 5) or physical erase; FIGs. 6a, b. |

METHOD, SYSTEM, AND PROGRAM FOR USING A TABLE TO DETERMINE AN ERASE OPERATION TO PERFORM

BACKGROUND OF THE INVENTION

1. Field of the Invention

A method, system, and program for using a table to determine an erase operation to perform in a manner consistent with system attributes.

2. Description of the Related Art

Different systems typically support different programs and features. The system attributes will often determine what actions are available to perform user specified operations. For instance, when a user specifies a secure erasure of data, the type of system will control what operations are taken to affect the secure erase of the data. In systems where an update to data is written to the same position on the physical space of the storage device including the data to update, a secure erase operation is performed by writing meaningless data, such as all zeros or ones, over the storage locations including the erased data to prevent any future access to the data. The storage locations subject to the erase operation may store data in a track or fixed block format.

Certain systems, such as the IBM RAMAC Virtual Array or ICEBERG disk storage systems provide for a virtual disk architecture, also referred to as Log Structured Array (LSA) system, in which mappings provide virtual locations of the data. LSA tables map host tracks to disk array storage locations where the data is stored. When data is written to the system, it is compressed and compacted, assembled into fixed blocks, and written to the DASD. All write operations in virtual disk architecture are always directed to a new place in the disk array. An erase operation in the LSA environment involves a space release operation in which all the pointers that provide the mapping from the erased virtual location to physical locations are set to zero. The storage space addressed by those pointers are then freed and available for data. Any future attempt to access the erased track, or pointer to the track, would result in a return of a null pointer, as the pointer was erased. ESA/390 is a trademark of IBM and RAMAC is a registered trademark of IBM; Iceberg is a registered trademark of Storage Technology Corporation.

Systems typically provide actions specific to the functions supported. However, some systems may allow for different operations to be performed by supporting multiple erase options and other data management operations. There is thus a need in the art for an improved system for performing operations, such as erase operations, that take into account all system functions affected by the erase operation to insure that no inconsistent actions are taken that would result in invalid states.

SUMMARY OF THE PREFERRED EMBODIMENTS

To overcome the limitations in the prior art described above, preferred embodiments disclose a method, system, program, and data structure for erasing data. A table is provided indicating different groupings of system functions. Each grouping indicates at least one system function. For each grouping there is code to perform erase operations. An erase command to erase data in at least one storage location is received. A determination is then made of the grouping having system functions supported by the system and the table is processed to determine the code for the determined grouping. The code for the determined grouping is executed to perform erase operations with respect to each storage location.

In further embodiments, one of the system functions is a point-in-time copy function that provides copy data structures that indicate data at source storage locations to copy to corresponding target source storage locations. The indication to copy with respect to the source and target storage locations is eliminated when the data is copied from the source storage location to the corresponding target storage location. The code associated with each grouping that includes the point-in-time copy function eliminates the indication to copy in the copy data structures for any source and target storage locations subject to the erase command.

In still further embodiments, the system functions include a first erase operation and a second erase operation. In such case, at least one grouping indicates at least the first and second erase operations as system functions. The code for each grouping indicating the first and second erase operations determines whether the first erase operation is available. If so, the first erase operation is used to implement the erase command. Otherwise, the second erase operation is used to implement the erase command.

Preferred embodiments provide a table to use to select a specific erase operation that is dependent on available system functions. When an erase operation occurs, the storage locations or tracks subject to the erase operation may also be subject to other data management operations, such as a point-in-time-copy operation. In such case, actions must be taken to ensure that the erase operation does not adversely affect these other data management operations in a manner that would produce inconsistent or invalid results. For this reason, the table specifies particular operations to perform dependent on the system functions available. In this way, any other data management operations will be appropriately adjusted to remain consistent with the erase operation being performed.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
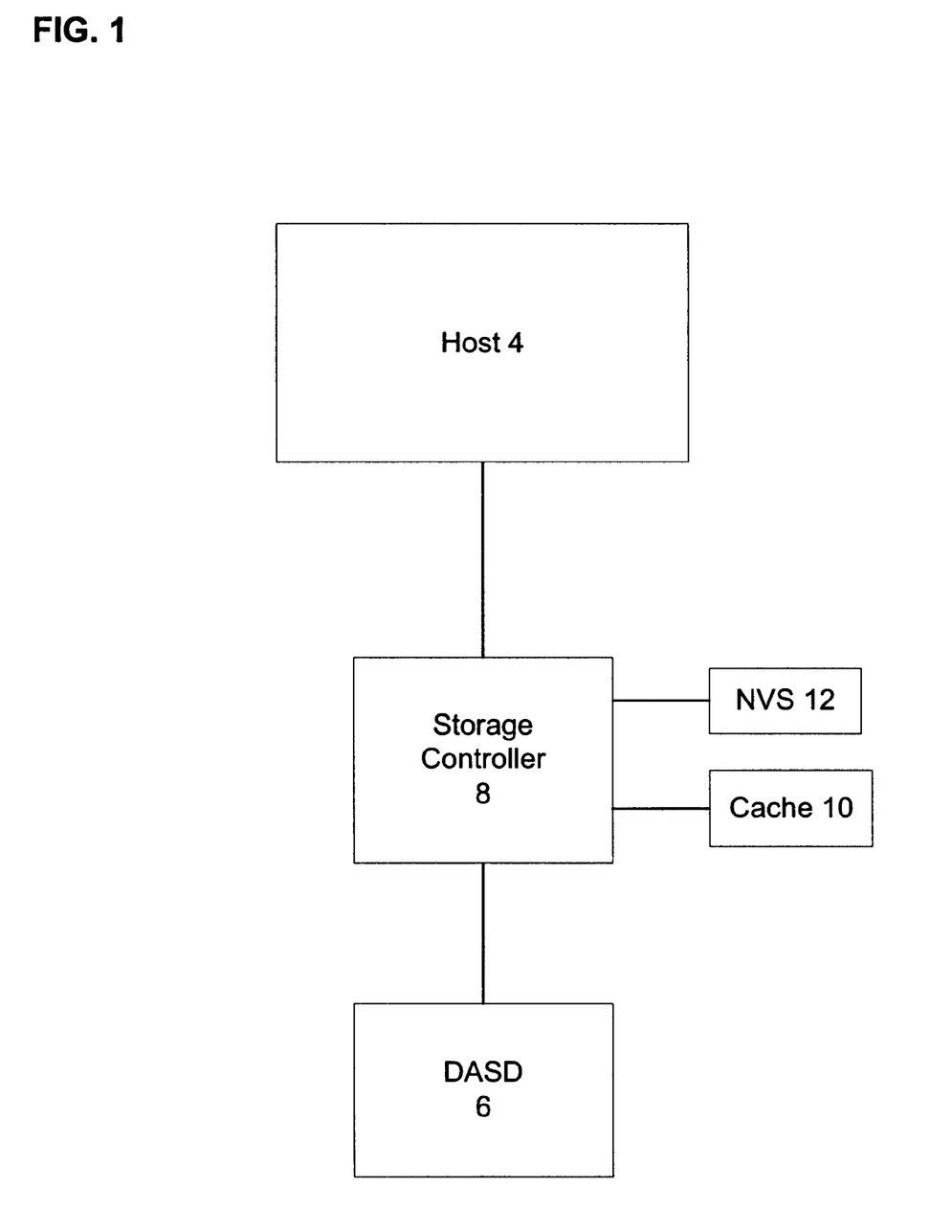
FIG. 1 is a block diagram illustrating a computing environment in which preferred embodiments of the present invention are implemented.

FIG. 1 illustrates a computing environment in which preferred embodiments are implemented. A host computer 4 performs data operations with respect to a DASD 6 via a storage controller 8 which manages access to the DASD 6. The storage controller 8 includes a cache 10. The storage controller 8 stages data from the DASD 6 into corresponding locations in the cache 10 that the host 4 requests. Similarly, data updates to tracks in the DASD 6 are stored in corresponding locations in the cache 10 until the data is destaged from cache 10 to DASD 6. The storage controller 8 may also copy any data updates written to cache 10 to a non-volatile storage unit (NVS) 12 to maintain for data recovery purposes. The NVS 12 is typically comprised of a battery backed-up volatile memory that can store the data updates for several hours in the event of a system failure.

The storage controller 8 may be comprised of the IBM 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety or the storage controller and host architecture described in the commonly assigned patent applications "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. Pat. Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. Pat. Ser. No. 09/168,017, which patent applications are incorporated herein by reference in their entirety.

The host 4 may be comprised of any type of computing device, such as a mainframe computer, that includes a computing architecture capable of communicating input/output (I/O) commands to the storage controller 8, such as the IBM ESA/390** System described in the IBM publication: "Enterprise Systems Architecture/390: ESCON I/O Interface," IBM document no. SA22-7202-02 (Copyright IBM Corp., 1990, 1991, 1992).

The DASD 6 may store data in a Count-Key-Data (CKD) format or fixed block format, such as the SCSI format. In the CKD format, each track includes one or more data records that are each prefaced with CKD information. The CKD information provides the name and format of a record, the key length, and the data length. The key field, which is optional and unrelated to the index key used to provide logical ordering to the application program 8 records, is used for searching and may indicate the last data set in the record. The data field provides a variable length record of user data sets. The number of CKD records that can be placed on a track depends on the length of the data areas of the records. Physical locations on the DASD 6 are identified according to cylinder, track, and the record on the track, i.e., CCHHR, where CC indicates the cylinder, HH indicates the track, and R indicates the record on the track. With the CKD format, the storage controller addresses records in the DASD 6 using the CCHHR location identifier. Alternatively, the DASD 6 may store data in addressable fixed blocks of data. In yet further embodiments, the DASD 6 may store data in any addressable storage unit known in the art, including CKD and FBA.

Preferred embodiments may be implemented using either the CKD and/or FBA architecture in systems that update data in place. This means that any updates to data in the DASD 6 are written directly to the same position on the physical space of the DASD 6 where the data to update resides. Alternatively, in embodiments utilizing the FBA architecture in a LSA system, data is stored in a compressed format on the DASD 6 and updates to data are written at the end of the file or last data track. The original data that was the subject of the update is then invalidated. In a virtual array such as LSA, the DASD 6 appears to the host 4 as an IBM 3990 type system with volumes of data defined according to CCHH locations. These volumes that appear to the host 4 are referred to as functional devices. The storage controller 8 maintains tables to map the functional devices or volumes the host 4 views to physical location in the DASD 6. If data is updated, then that new updated data is stored at a new location in the DASD 6, and the storage controller 8 updates the tables to have the functional device point to the new location storing the updated data. In this way, the host 4 always references the data according to a CCHH location that remains unchanged. The storage controller 8 maintains tables to map the host 4 view to actual fixed blocks on the DASD 6.

Data Structures For Logical Point-In-Time Copying and Logical Erase

In preferred embodiments, the storage controller 8 may be capable of performing logical point-in-time copying and erase operations. To perform these operations, the storage controller 8 builds various data structures when the host initiates a point-in-time copy operation and erase operation.

The host 4 may generate a command to make a point-in-time copy of certain tracks or data sets as of a particular moment. A point-in-time copy operation involves copying data from source tracks or areas to target tracks or areas. The source and target locations may be in the same or different logical volumes, or on the same or different physical storage devices, i.e., DASDs.

The host system 4 initiates a point-in-time copy operation on an extent, i.e., consecutive range of tracks, to preserve a copy of the data in the extent as of a particular time by specifying the source of the extent of tracks subject to the point-in-time copy and the target tracks which will maintain a copy of the source tracks. The source tracks are referred to as the protected tracks. In response to this command, the storage controller 8 generates source and target bit map data structures having bit map values that correspond to the tracks at the respective source and target physical locations in DASD 6. A bit map value of "on" or binary one indicates that the protected tracks at the point-in-time reside at the source physical location in DASD 6.

Figure 2:
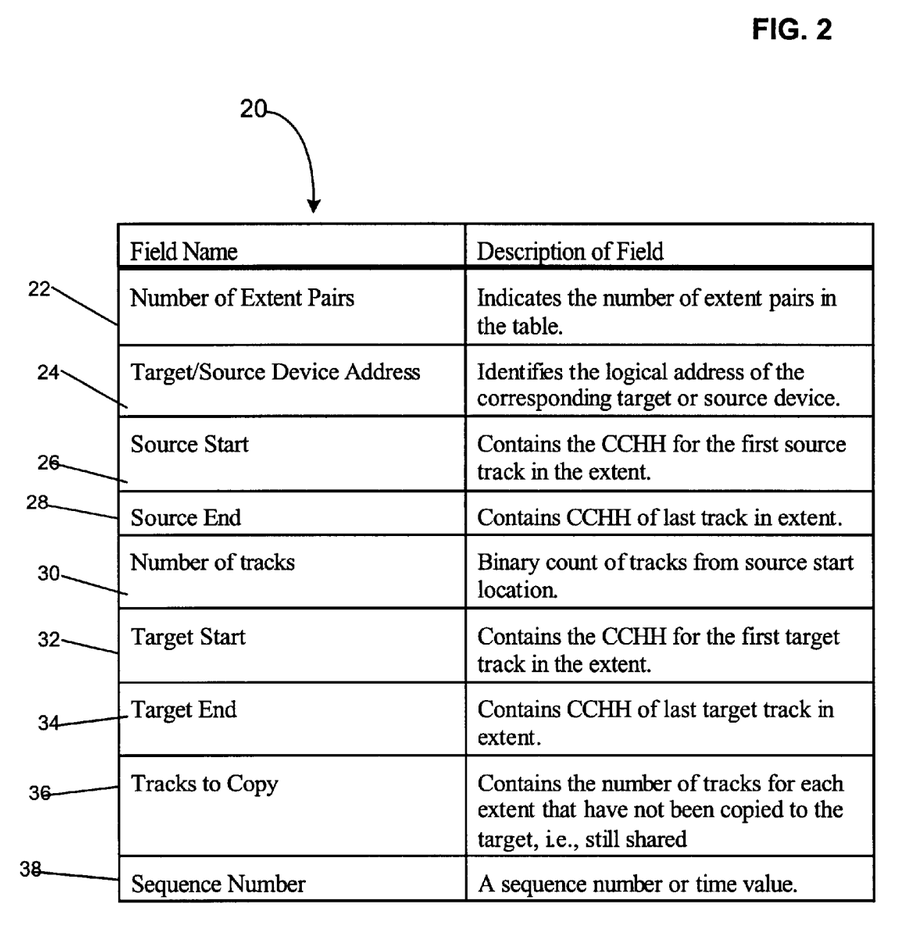
FIG. 2 illustrates a relationship table in accordance with preferred embodiments of the present invention.

The storage controller 8 further generates a relationship table for each bit map that provides a mapping of the locations in the bit map to the source and target locations in DASD 6 of the data subject to the point-in-time copy. FIG. 2 illustrates the fields in both the source and target relationship tables. The relationship table is used in conjunction with the bit map to determine the status of protected tracks, the source location of the protected tracks the bit map represents, and the location of the target for the protected tracks. An extent number field 22 indicates the number of extent pairs in the table. An extent pair comprises each group of continuous protected tracks maintained at the source location having corresponding tracks at the target location, i.e., a source/target pair. Within a range of tracks subjected to a point-in-time copy operation, there may be multiple extents of consecutive tracks at different source locations. A copy operation may involve multiple extent pairs if the source tracks for target tracks are located on different devices or logical volumes. The relationship table 20 maintains information in fields 24–34 for each extent pair indicated by the extent number 22. The device address 24 indicates the logical address of the physical storage for the corresponding target or source tracks. The source start 26 has the CCHH, FBA or location of the first source track in the extent and the source end 28 has the last protected track. The number of tracks 30 indicates the number of contiguous protected tracks to be copied from the source to the target for that extent. Each bit map value corresponds to one of the source/target track pairs subject to the point-in-time copy relationship. The tracks to copy field 36 indicates the number of tracks for each extent that have not been copied to the target, i.e., are still at the source. The sequence number 38 is a time value indicating a time or sequence when the information for an extent pair, i.e., a set of fields 22–36, was generated into the relationship table with respect to previous extent pairs in the relationship table.

Figure 3:
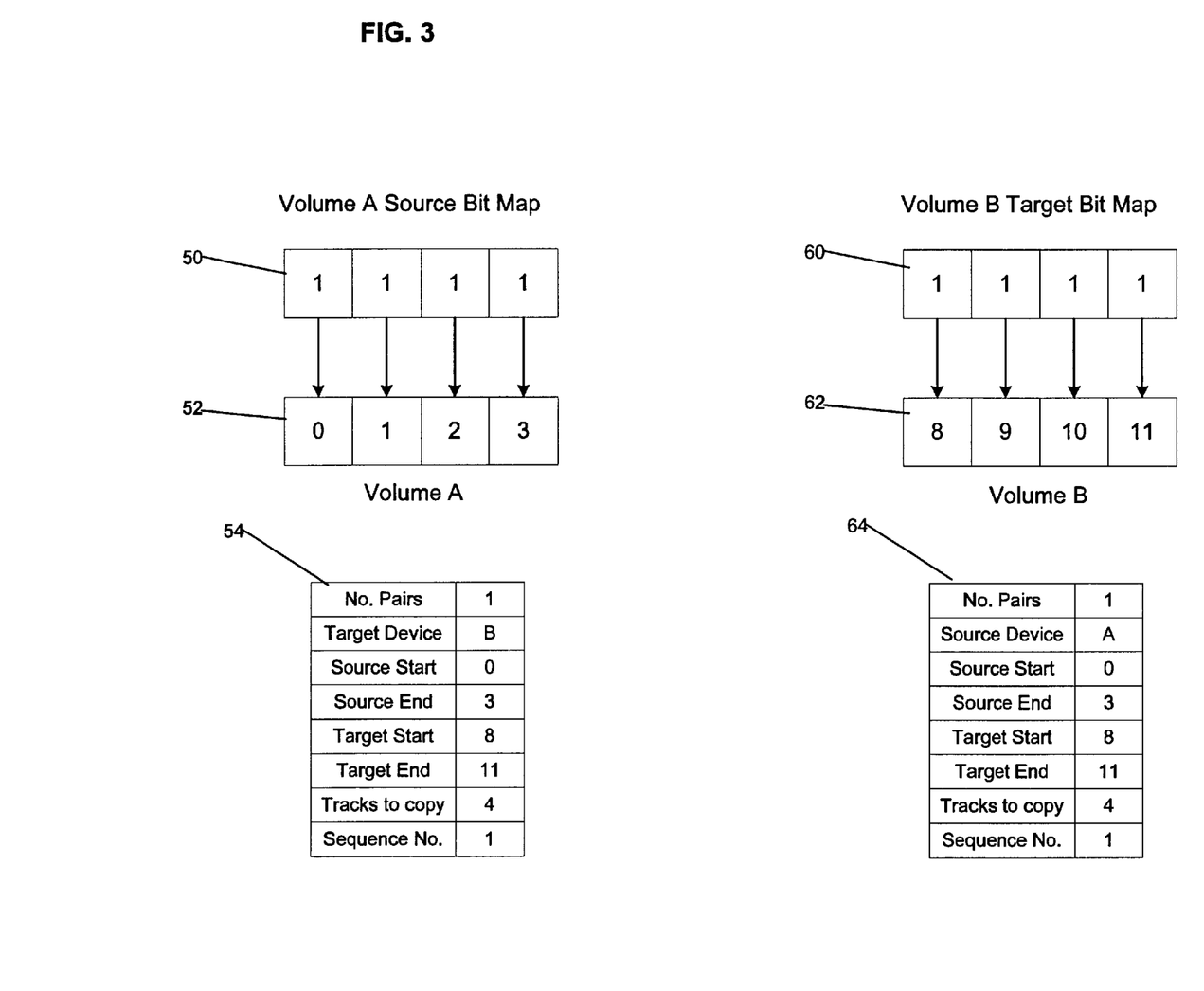
FIG. 3 illustrates block diagrams of data structures in accordance with preferred embodiments of the present invention.

The purpose of both the bit map data structures and relationship tables are to allow an instant copy of source data to be made, without having to perform actual data copy operations that can consume system resources and interfere with host 4 access to the data. FIG. 3 illustrates the result of a point-in-time copy operation in accordance with the preferred embodiments. In the example of FIG. 3, a point-in-time copy request from source tracks 0, 1, 2, and 3 in Volume A are made to target tracks 8, 9, 10, and 11 in Volume B. In response the storage controller 8 creates a source 50 and target 60 bit maps having bit map values corresponding to each of the tracks on the source 52 and target 62 devices, respectively. A one or "on" value indicates that the point-in-time copy is on the source track and a zero indicates that the point-in-time copy has been copied from the source track location to the target. The storage controller 8 would further generate source 54 and target 64 relationship tables. The source relationship table 54 for the source tracks 52 indicates that the target of the point-in-time copy is target device B, and the track ranges for the source and target. The target relationship table 64 includes the same information, except that the target table 64 indicates the source device. These relationship tables 54, 64 provide information on the protected tracks for the source and target locations.

If data was to be updated at the source tracks, then the original data in the source tracks would be copied to the target tracks. After data is copied from the source to target tracks, the bit map values in bit maps 50 and 60 corresponding to the tracks where data was copied from the source to target are set to zero. Further, the tracks to copy field in the relationship tables 54 and 64 is decremented by the number of source to target tracks copied. The commonly assigned and co-pending patent application entitled "Method, System, And Program For Maintaining Electronic Data as of a Point-in-Time," to William K. Micka, David M. Shackelford, and Yoram Novik, having U.S. Ser. No. 09/347,344 and filed on Jul. 2, 1999, which application is incorporated herein by reference in its entirety, describes further detail of the point-in-time copy operation.

With the data structures described with respect to FIG. 3, the storage controller 8 may perform a logical copy operation without having to transfer data between the source and target locations. Instead, the bit map 50, 60 and relationship table 54, 64 data structures maintain the point-in-time data at either source or target location.

The system may further include the capability to perform a logical erase operation by using the bit map and relationship table data structures. The host system 4 would initiate an erase operation on an extent, i.e., consecutive range of tracks. The target tracks are referred to as the tracks subject to the erase operation. In response to this command, the storage controller 8 performs a logical erase operation by generating a target bit map data structure having bit map values that correspond to the tracks at the respective target physical locations in DASD 6 that are subject to the erase operation. A bit map value of "on" or binary one indicates that the corresponding track is in an erased state. With logical erase, there is no corresponding source data structures because the data to place in the target track locations is erased data, or meaningless data.

The storage controller 8 further generates a relationship table for the target bit map that provides a mapping of the locations in the bit map to storage locations that are in an erased state. The relationship table would include the same fields as in relationship table 20 in FIG. 2. However, in the target/source device address field 24 identifying the source tracks, the storage controller 8 would place a special erase code indicating that the target tracks are subject to a logical erase operation. In the case of the logical erase, there is no data in the source to copy to the target tracks, except empty or meaningless data; hence the use of the special erase code. The source start 26 and end 28 fields would be left empty as there are no source tracks to copy in an erase operation. The target start 32 and end 34 fields indicate the range of tracks subject to the logical erase operation, i.e., in the logical erase state. The tracks to copy field 36 would indicate the number of tracks at the target to overwrite with meaningless data. As data is physically erased at the storage device, then the field 36 is decremented. The co-pending and commonly assigned patent application, entitled "Method, System, And Program For Logically Erasing Data," to William F. Micka and David M. Shackelford, having U.S. Ser. No. 09/347,344, which application is incorporated herein by reference in its entirety, describes further details of the logical erase operation.

In the logical erase operation, the purpose of both the bit map data structure and relationship table are to place the tracks in a logical erase state that prevents host 4 applications from accessing the logically erased data and, at the same time, avoids having to physically erase the data. Operations to overwrite data as part of an erase procedure can consume substantial system I/O resources and interfere with host 4 access to the data. If a host 4 attempts to access data at a target track, having a corresponding bit map value of one and a relationship table indicating that the track is subject to a logical erase operation, then the storage controller 8 would return an indication to the host 4 that the data is erased or subject to an erase operation.

Performing Delete Operations Using A System Attribute Table

Preferred embodiments provide an erase table indicating the erase actions for the storage controller 8 to implement. The actions to implement are dependent on the technologies or system functions the system supports, i.e., whether the storage controller supports LSA operations, logical point-in-time copy and/or logical erase functionality. This table would provide code, or pointers to code, that the storage controller 8 executes to perform specific actions dependent on the technologies supported by the storage controller.

Figure 4:
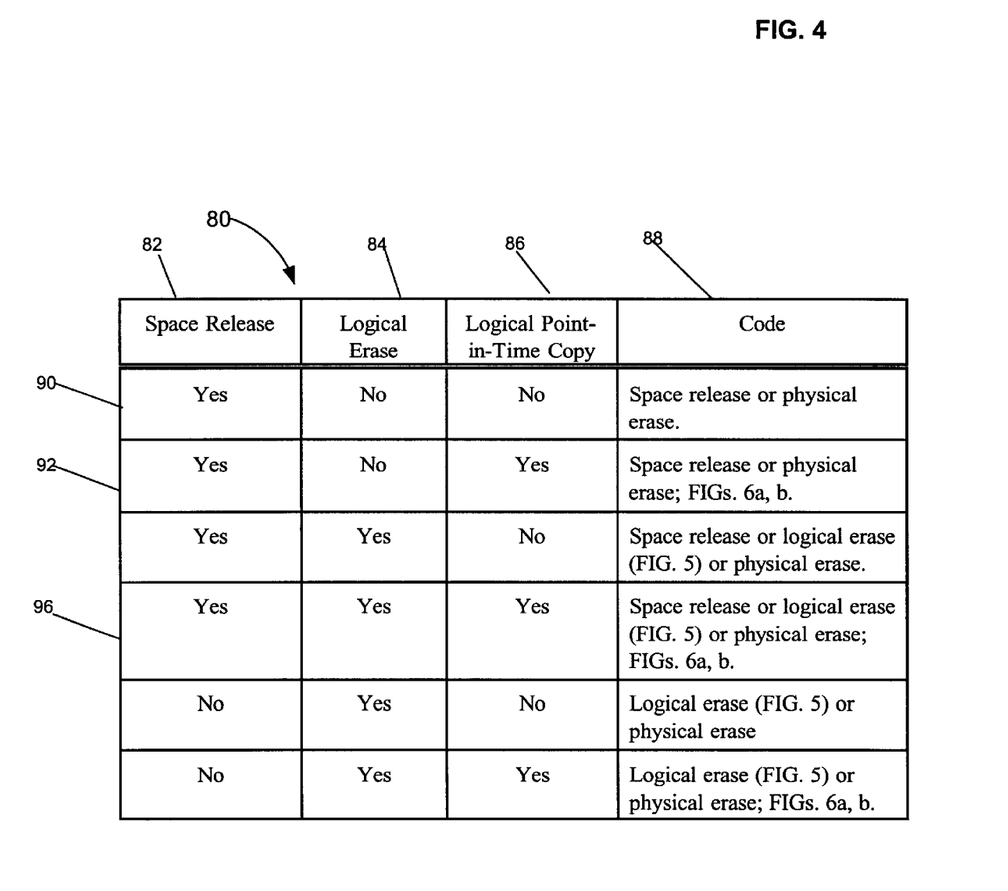
FIG. 4 illustrates an erase table in accordance with preferred embodiments of the present invention.

FIG. 4 illustrates an erase table 80 including three possible supported technologies: space release 82, which is the erasure of pointers performed in the LSA system; logical erase 84 described above; and logical point-in-time copy 86 also described above. Each row indicates a possible combination of supported technologies 82, 84, and 86, and the code column 88 indicates the operations to perform for the combination of supported technologies in the same row.

The different erase operations that may be performed, depending on the combination of supported technologies, comprise a space release operation; a logical erase operation when logical point-in-time copy is not supported; and a logical erase when logical point-in-time copy is supported.

If a space release operation is performed, then the storage controller 8 sets all the pointers for the data tracks subject to the erase to a null value to prevent the return of any data if a subsequent operation requests data subject to the space release erase. The tracks in the DASD 6 to which the erased pointers previously addressed are made available for subsequent write operations.

Figure 5:
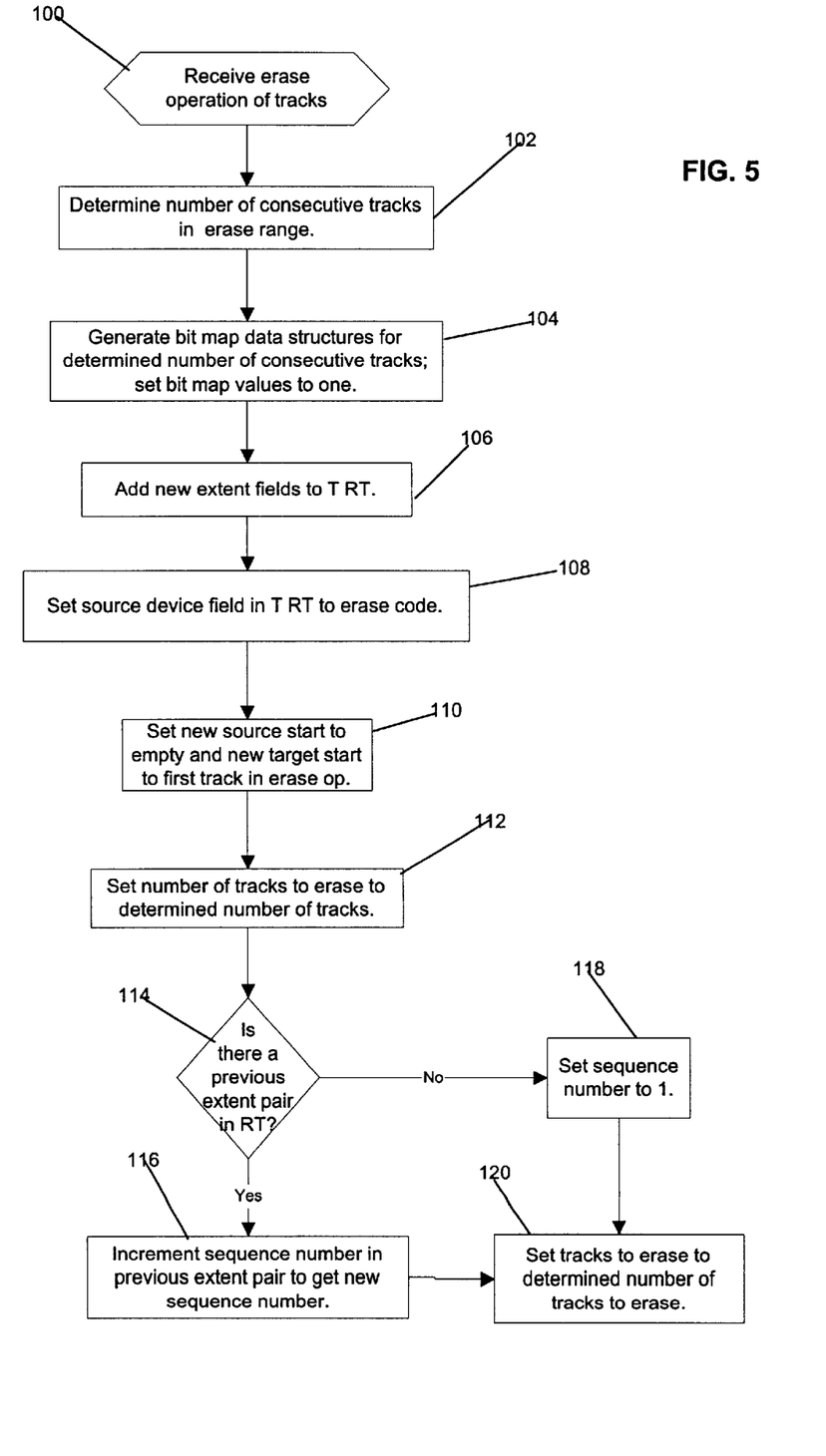
FIG. 5 illustrates logic to perform a logical erase operation in accordance with preferred embodiments of the present invention.

If a logical erase is performed when logical point-in-time copy is not supported, then the storage controller 8 would execute the logic of FIG. 5. Control begins at block 100 with the storage controller 8 receiving an erase operation specifying a range of tracks to erase. The storage controller 8 determines (at block 102) the number of consecutive tracks from the first track in the erase range. The storage controller 8 then generates (at block 104) a bit map data structure for the determined number of consecutive track and sets the bit map values to one. Each bit map value corresponds to one of the consecutive tracks subject to an erase operation. The storage controller 8 then adds (at block 106) to the relationship table a new set of extent fields, fields 24–36 for the logical erase operation. The source device field 24 in the target relationship table (T RT) is set (at block 108) to the erase code, the new source start 26 and end 28 are set (at block 110) to empty, and the target start 32 is set to the starting track subject to the erase. The number of tracks field 30 indicating the number of tracks involved in the erase operation is then set (at block 112) to the determined number of tracks. The storage controller 8 then determines (at block 114) whether there is another set of extent fields, fields 24–36, in the target relationship table, indicating a previous erase and/or copy operation. If so, the storage controller 8 increments (at block 116) the sequence number 38 in the previous set of fields to obtain the new sequence number; otherwise, the sequence number is set (at block 118) to one. The storage controller 8, from block 118 or 116, then sets (at block 120) the tracks to erase field 36 to the determined number of tracks to erase.

Figure 6A:
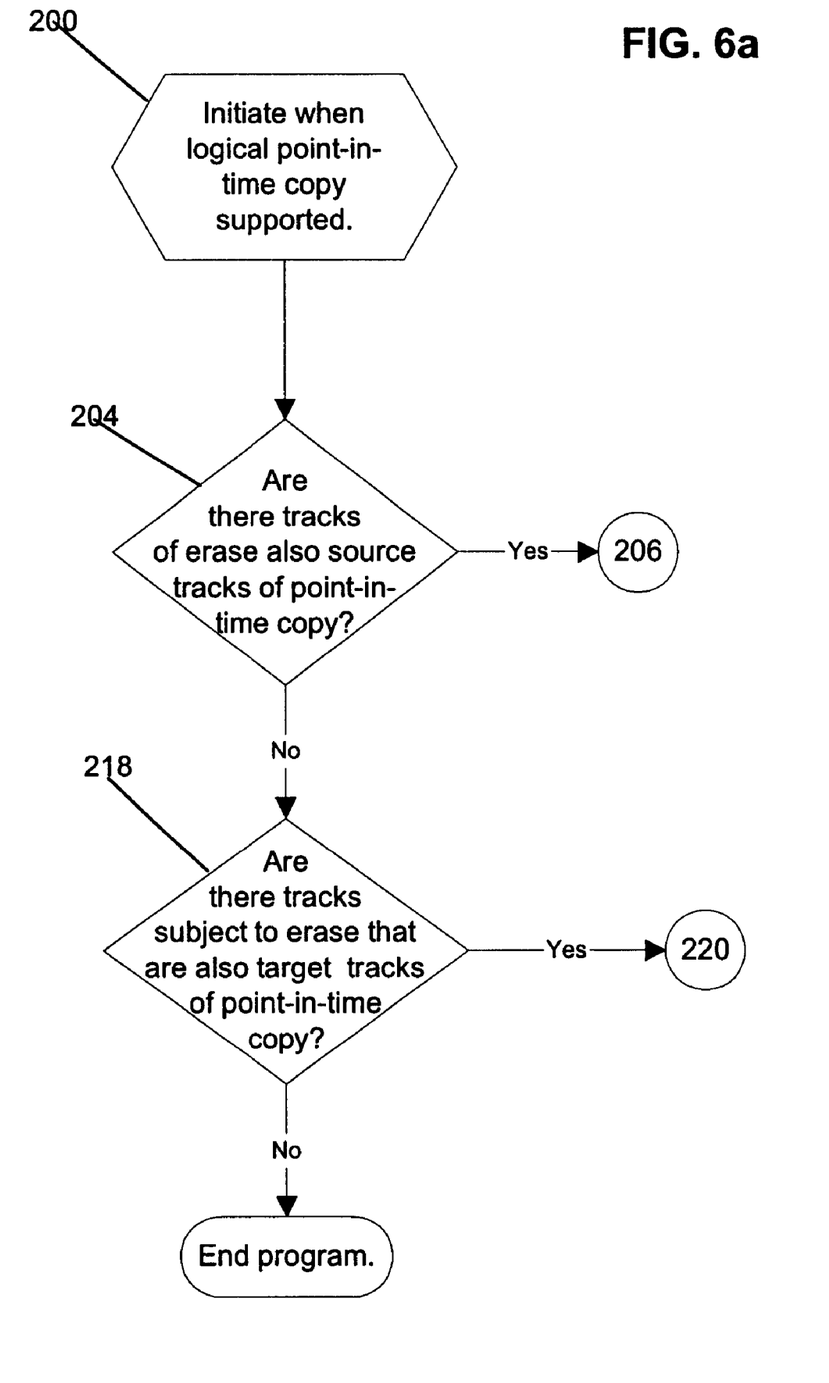
FIGS. 6a, b illustrate logic to modify any point-in-time data structures to make consistent with the erase operation in accordance with preferred embodiments of the present invention.
Figure 6B:
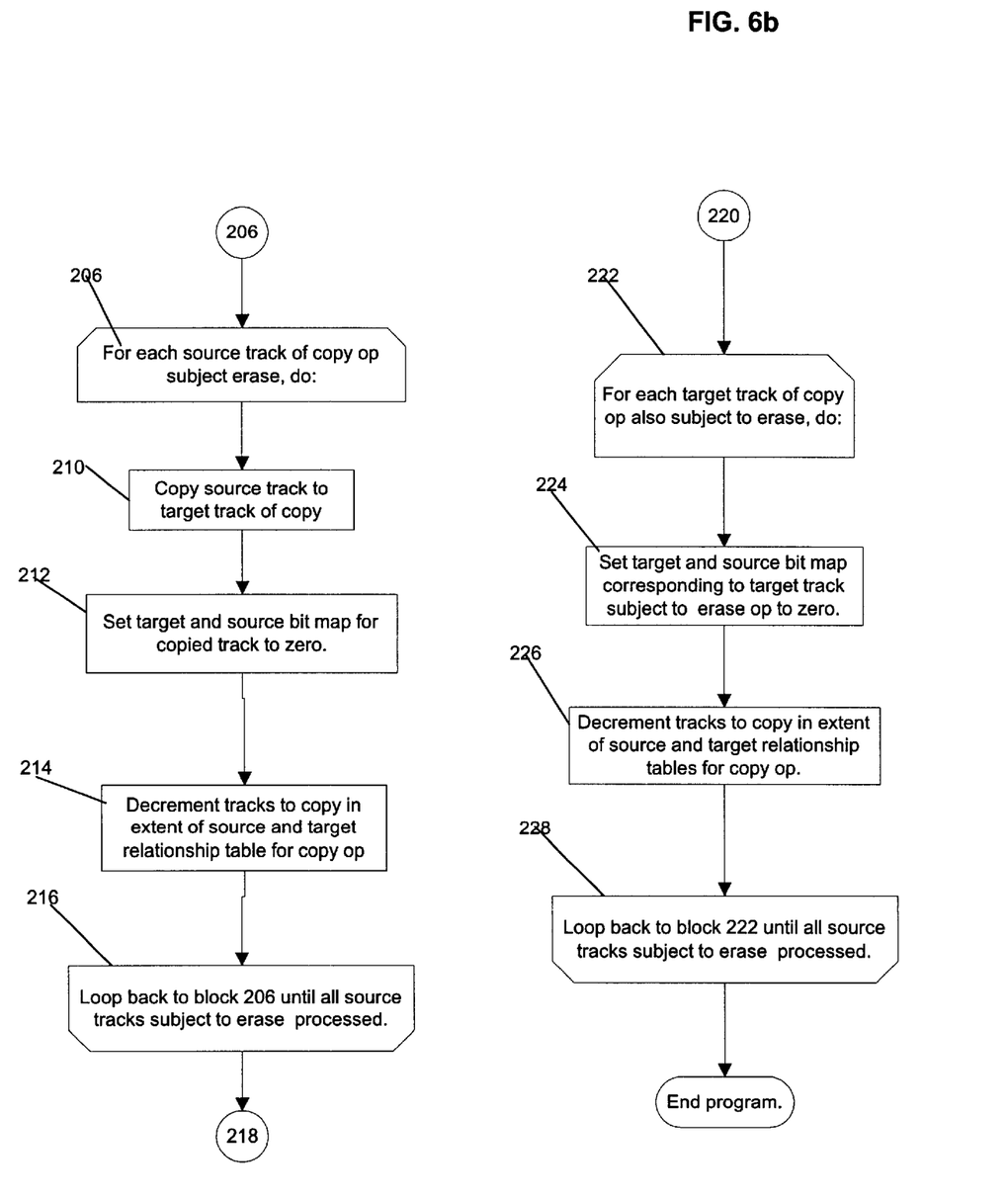

FIGS. 6a and b illustrate logic executed by the storage controller 8 in the event that a space release, logical erase or physical secure erase is performed when logical point-in-time copy is an available technology. Control begins at block 200 where the storage controller 8 performs an erase operation, e.g., logical erase, space release, physical erase, when logical point-in-time copy is supported. The storage controller 8 determines (at block 204) whether any of the tracks subject to the erase are also source tracks of a point-in-time copy operation. If so, the storage controller 8 initiates a loop of operations (at block 206) to perform for each source track in a point-in-time copy state that is also subject to the erase operation. For each such source track (at block 206), the storage controller 8 copies (at block 210) the data at the source track to the corresponding target track, based on the relationship table 54 information indicating the target track. The storage controller 8 then sets (at block 212) the values to zero that are in the target and source bit map data structures 50, 52 corresponding to the track copied from the source to the target. The storage controller 8 further decrements (at block 214) the tracks to copy field 36 in the extent of the source and target relationship tables subject to the copy operation. The storage controller 8 then performs (at block 216) another iteration of this loop of operations at block 210 to 214 until all tracks to erase that are the source of a point-in-time copy operation are processed.

After determining the tracks of the erase operation (logical erase, space release, physical erase) that are also the source tracks of a point-in-time copy operation, from blocks 204 or 216, the storage controller determines (at block 218) whether there are tracks subject to the erase operation that are also target tracks of a point-in-time copy operation. If so, the storage controller 8 initiates a loop (at block 222) to perform steps 224 and 226 for each track subject to the erase that is also the target track for a point-in-time copy operation. The storage controller 8 sets (at block 224) the target and source bit map values corresponding to the track subject to the erase to zero and decrements (at block 226) the tracks to copy field 36 in the source and target relationship tables for the copy operation. The storage controller 8 performs another iteration of the loop (at block 228) for each track subject to the erase that is also the target track of a point-in-time copy operation.

FIG. 4 illustrates the operations to perform in the code column 88, depending on the combination of technologies available to the storage controller 8 as indicated in the columns 82, 84, and 86 of a row. For instance, row 90 indicates the operations to perform when only space release is available. As indicated in column 88 of row 90, the storage controller 8 first attempts a space release operation, and then if unavailable, a physical erase operation. If space release and point-in-time copy are supported, then, as indicated in row 92, the storage controller first tries a space release operation and then the physical erase if space release is not functioning. After performing the erase operation, the storage controller 8 then executes the logic of FIGS. 6a, b to make any modifications to the point-in-time data structures affected by the erase operation. Thus, the code column 88 indicates the order of erase operations. For instance, when all three capabilities are supported, as indicated in row 96, the storage controller 8 first tries space release, then logical erase (FIG. 5), and then physical erase, in that order, until the first attempted erase operation works. After performing the erase, the storage controller executes the logic of FIGS. 6a, b to reset any tracks involved in a point-in-time copy operation that are affected by the erase operation.

To perform an erase operation, the storage controller 8 would first determine the technologies supported by the device, as indicated in a configuration data or a device characteristics file. After determining the supported technologies, the storage controller 8 would then process the table 80 to determine the code to execute, as indicated in the code column 88, depending on the values in the supported technology columns 82, 84, and 86. After determining the row in the table 80 that represents the supported technologies, the storage controller 8 would then execute the code indicated in the code column 88 of the same row of the available technologies to carry-out the erase operation. Alternatively, if the user specified a secure erase operation, then the storage controller 8 could override the erase operations specified in the code column 8 and proceed immediately to perform a secure physical erase by overwriting the data.

The code column 8 may include all the code necessary for the storage controller 8 to execute. Alternatively, the code column 88 may include pointers to one or more modules or objects of code to execute to perform the operations indicated in the code column 88. For instance, the logic of FIGS. 5 and 6a, b may be implemented in separately callable modules.

The table 80 may be maintained as part of a program executed by the storage controller 8. Alternatively, the storage controller 8 can build the table during initialization to include as rows those features supported by the storage controller 8 and the associated code columns 88. Further, in the event that the storage controller 8 was updated with new software options, then the table 80 could be updated to reflect the new options, including accompanying code.

In this way, the preferred table structure provides specific operations to perform to implement an erase operation dependent on the available system functions. This assures that any system functions, such as point-in-time copy, affected by the erase operation are adjusted to prevent inconsistencies or invalid operations.

Conclusion and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as performing erase and copy operations with respect to tracks of data. However, in alternative embodiments, the erase and copy operations of the preferred embodiments may apply to any type of storage unit representing a storage structure storing data.

Preferred embodiments were described with respect to separate bit map and relationship table data structures for source and target locations involved in logical erase and point-in-time copy operations. However, in alternative embodiments the information maintained in the described bit map and relationship table data structures may be maintained in a different data structure format than that described herein.

Preferred embodiments may be implemented in update-in place systems in which updates are written to the previous location of the updated data. In case of an update, the point-in-time data is copied to the target location to allow the update to proceed at the source location. Alternatively, the preferred embodiments may apply to a virtual storage location, such as an LSA virtual array, where a table maps logical storage locations to actual physical locations. In such case the source and target locations comprise virtual arrays or pointers to physical locations. An update to the logically erased data would involve an update to a new location and modifying the source virtual array pointers to address the updated copy at the new location.

The table in the preferred embodiments was described with respect to specific available functions, e.g., space release, logical erase, logical point-in-time copy, and specific operations to perform depending on the combination of the available functions. However, the table may be expanded to include numerous other available system technologies and other specific operations to perform to affect an erase operation. Moreover, preferred embodiments were described with respect to using the table to determine specific erase operations to perform based on available system technologies. However, the table may accommodate different operations than erase operations, such as copy operations, update operations, read, write, etc. In such case, the table would be used to determine how to implement those operations based on the technologies present in the system.

In summary, preferred embodiments disclose a method, system, and program for erasing data. A table is provided indicating different groupings of system functions. Each grouping indicates at least one system function. For each grouping there is code to perform erase operations. An erase command to erase data in at least one storage location is received. A determination is then made of the grouping having system functions supported by the system and the table is processed to determine the code for the determined grouping. The code for the determined grouping is executed to perform erase operations with respect to each storage location.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for erasing data in computer memory, comprising:

storing a table indicating different groupings of system functions, wherein each grouping indicates at least one system function and for each grouping indicating code to perform erase operations;

receiving an erase command to erase data in at least one storage location;

determining the grouping having system functions supported by the system;

processing the table to determine the code for the determined grouping; and executing the code for the determined grouping to perform erase operations with respect to each storage location.

2. The method of claim 1, wherein the groupings include at least one system function that is a member of the system functions consisting of a point-in-time copy operation, logical erase, and erasing pointers to physical storage areas.

3. The method of claim 1, wherein one of the system functions is a point-in-time copy function that provides copy data structures that indicate data at source storage locations to copy to corresponding target source storage locations, and wherein executing the code associated with each grouping that includes the point-in-time copy function comprises eliminating the indication to copy in the copy data structures for any source and target storage locations subject to the received erase command.

4. The method of claim 3, wherein executing the code associated with each grouping that includes the point-in-time copy function further comprises:

determining whether any source storage location for which there is an indication to copy is subject to the received erase command;

performing for each determined source storage location that is subject to the received erase command:

(i) copying the data from the source storage location to the corresponding target storage location; and (ii) modifying the copy data structures to eliminate the indication to copy for each source target location subject to the erase command and each corresponding target storage location.

5. The method of claim 3, wherein executing the code associated with each grouping that includes the point-in-time copy function further comprises:

determining whether any target storage location for which there is an indication to copy is subject to the received erase command; and modifying the copy data structures to eliminate the indication to copy for each determined target storage location that is subject to the received erase command and the corresponding source storage locations.

6. The method of claim 1, wherein the system functions include a first erase operation and a second erase operation wherein at least one grouping indicates at least the first and second erase operations as system functions, and wherein executing the code for each grouping indicating the first and second erase operations comprises:

determining whether the first erase operation is available;

using the first erase operation to implement the erase command after determining that the first erase operation is available; and using the second erase operation to implement the erase command after determining that the first erase operation is not available.

7. The method of claim 6, wherein the first erase operation is a logical erase operation that indicates storage locations subject to an erase state without physically erasing the data at the storage locations and the second erase operation overwrites the data at the storage locations subject to the erase command.

8. The method of claim 6, wherein the first erase operation erases pointers to physical storage areas when the storage locations comprise pointers to physical storage areas without physically erasing the data at the physical storage areas and the second erase operation overwrites the data at the storage locations subject to the erase command.

9. The method of claim 1, wherein the system functions include a first erase operation, a second erase operation, and a third erase operation, wherein at least one grouping indicates at least the first, second, and third erase operations as system functions, and wherein executing the code for each grouping indicating the first, second, and third erase operations comprises:

determining whether the first erase operation is available;

using the first erase operation to implement the erase command after determining that the first erase operation is available;

determining whether the second erase operation is available after determining that the first erase operation is not available;

using the second erase operation to implement the erase command after determining that the second erase operation is available; and using the third erase operation to implement the erase command after determining that the second erase operation is not available.

10. The method of claim 9, wherein the first erase operation erases pointers to physical storage areas when the storage locations comprise pointers to physical storage areas without physically erasing the data at the physical storage areas, wherein the second erase operation is a logical erase operation that indicates storage locations subject to an erase state without physically erasing the data at the storage locations, and the third erase operation overwrites the data at the storage locations subject to the erase command.

11. A system for erasing data in a storage device, comprising:

a processor having access to the storage device;

a memory storing a table indicating different groupings of system functions, wherein each grouping indicates at least one system function and, for each grouping, indicating code to perform erase operations;

program logic executed by the processor, comprising:

(i) means for receiving an erase command to erase data in at least one storage location;

(ii) means for determining the grouping from the table in memory having system functions supported by the system;

(iii) means for processing the table in memory to determine the code for the determined grouping; and (iv) means for executing the code for the determined grouping to perform erase operations with respect to each storage location.

12. The system of claim 11, wherein the groupings indicated in the table in memory include at least one system function that is a member of the system functions consisting of a point-in-time copy operation, logical erase, and erasing pointers to physical storage areas.

13. The system of claim 11, wherein one of the system functions is a point-in-time copy function, wherein the memory includes copy data structures that indicate data at source storage locations to copy to corresponding target source storage locations, and wherein the program logic for executing the code associated with each grouping that includes the point-in-time copy function further comprises means for eliminating the indication to copy in the copy data structures for any source and target storage locations subject to the received erase command.

14. The system of claim 13, wherein the program logic for executing the code associated with each grouping that includes the point-in-time copy function further comprises:

means for determining whether any source storage location for which there is an indication to copy is subject to the received erase command;

means for causing the processor to perform for each determined source storage location that is subject to the received erase command:

(i) copying the data from the source storage location to the corresponding target storage location; and (ii) modifying the copy data structures to eliminate the indication to copy for each source target location subject to the erase command and each corresponding target storage location.

15. The system of claim 13, wherein the program logic for executing the code associated with each grouping that includes the point-in-time copy function further comprises:

means for determining whether any target storage location for which there is an indication to copy is subject to the received erase command; and means for modifying the copy data structures to eliminate the indication to copy for each determined target storage location that is subject to the received erase command and the corresponding source storage locations.

16. The system of claim 11, wherein the system functions include a first erase operation and a second erase operation wherein at least one grouping indicates at least the first and second erase operations as system functions, and wherein the program logic for executing the code for each grouping indicating the first and second erase operations comprises:

means for determining whether the first erase operation is available;

means for using the first erase operation to implement the erase command after determining that the first erase operation is available; and means for using the second erase operation to implement the erase command after determining that the first erase operation is not available.

17. The system of claim 16, wherein the first erase operation is a logical erase operation that indicates storage locations subject to an erase state and the second erase operation includes logic for overwriting the data at the storage locations subject to the erase command.

18. The system of claim 17, wherein the first erase operation includes logic for erasing pointers to physical storage areas when the storage locations comprise pointers to physical storage areas without physically erasing the data at the physical storage areas and the second erase operation includes logic for overwriting the data at the storage locations subject to the erase command.

19. The system of claim 11, wherein the system functions in the table in memory include a first erase operation, a second erase operation, and a third erase operation, wherein at least one grouping indicates at least the first, second, and third erase operations as system functions, and wherein the program logic for executing the code for each grouping indicating the first, second, and third erase operations comprises:

means for determining whether the first erase operation is available;

means for using the first erase operation to implement the erase command after determining that the first erase operation is available;

means for determining whether the second erase operation is available after determining that the first erase operation is not available;

means for using the second erase operation to implement the erase command after determining that the second erase operation is available; and means for using the third erase operation to implement the erase command after determining that the second erase operation is not available.

20. The system of claim 19, wherein the first erase operation erases pointers to physical storage areas when the storage locations comprise pointers to physical storage areas without physically erasing the data at the physical storage areas, wherein the second erase operation is a logical erase operation that indicates storage locations subject to an erase state without physically erasing the data at the storage locations, and the third erase operation overwrites the data at the storage locations subject to the erase command.

21. An article of manufacture for use in erasing data, the article of manufacture comprising computer readable storage media including at least one computer program embedded therein that is capable of causing the computer to perform:

storing a table indicating different groupings of system functions, wherein each grouping indicates at least one system function and for each grouping indicating code to perform erase operations;

receiving an erase command to erase data in at least one storage location;

determining the grouping having system functions supported by the system;

processing the table to determine the code for the determined grouping; and executing the code for the determined grouping to perform erase operations with respect to each storage location.

22. The article of manufacture of claim 21, wherein the groupings include at least one system function that is a member of the system functions consisting of a point-in-time copy operation, logical erase, and erasing pointers to physical storage areas.

23. The article of manufacture of claim 21, wherein one of the system functions is a point-in-time copy function that provides copy data structures that indicate data at source storage locations to copy to corresponding target source storage locations, and wherein executing the code associated with each grouping that includes the point-in-time copy function comprises eliminating the indication to copy in the copy data structures for any source and target storage locations subject to the received erase command.

24. The article of manufacture of claim 23, wherein executing the code associated with each grouping that includes the point-in-time copy function further comprises:

determining whether any source storage location for which there is an indication to copy is subject to the received erase command;

performing for each determined source storage location that is subject to the received erase command:
      (i) copying the data from the source storage location to the corresponding target storage location; and
      (ii) modifying the copy data structures to eliminate the indication to copy for each source target location subject to the erase command and each corresponding target storage location.

25. The article of manufacture of claim 23, wherein executing the code associated with each grouping that includes the point-in-time copy function further comprises:

determining whether any target storage location for which there is an indication to copy is subject to the received erase command; and modifying the copy data structures to eliminate the indication to copy for each determined target storage location that is subject to the received erase command and the corresponding source storage locations.

26. The article of manufacture of claim 21, wherein the system functions include a first erase operation and a second erase operation wherein at least one grouping indicates at least the first and second erase operations as system functions, and wherein executing the code for each grouping indicating the first and second erase operations comprises:

determining whether the first erase operation is available;

using the first erase operation to implement the erase command after determining that the first erase operation is available; and using the second erase operation to implement the erase command after determining that the first erase operation is not available.

27. The article of manufacture of claim 26, wherein the first erase operation is a logical erase operation that indicates storage locations subject to an erase state without physically erasing the data at the storage locations and the second erase operation overwrites the data at the storage locations subject to the erase command.

28. The article of manufacture of claim 26, wherein the first erase operation erases pointers to physical storage areas when the storage locations comprise pointers to physical storage areas without physically erasing the data at the physical storage areas and the second erase operation overwrites the data at the storage locations subject to the erase command.

29. The article of manufacture of claim 21, wherein the system functions include a first erase operation, a second erase operation, and a third erase operation, wherein at least one grouping indicates at least the first, second, and third erase operations as system functions, and wherein executing the code for each grouping indicating the first, second, and third erase operations comprises:

determining whether the first erase operation is available;

using the first erase operation to implement the erase command after determining that the first erase operation is available;

determining whether the second erase operation is available after determining that the first erase operation is not available;

using the second erase operation to implement the erase command after determining that the second erase operation is available; and using the third erase operation to implement the erase command after determining that the second erase operation is not available.

30. The article of manufacture of claim 29, wherein the first erase operation erases pointers to physical storage areas when the storage locations comprise pointers to physical storage areas without physically erasing the data at the physical storage areas, wherein the second erase operation is a logical erase operation that indicates storage locations subject to an erase state without physically erasing the data at the storage locations, and the third erase operation overwrites the data at the storage locations subject to the erase command.

* * * * *